No. 638,649.  
H. R. SIEVERKROPP.  
BICYCLE PEDAL ATTACHMENT.  
(Application filed Feb. 14, 1899.)
(No Model.)
Patented Dec. 5, 1899.
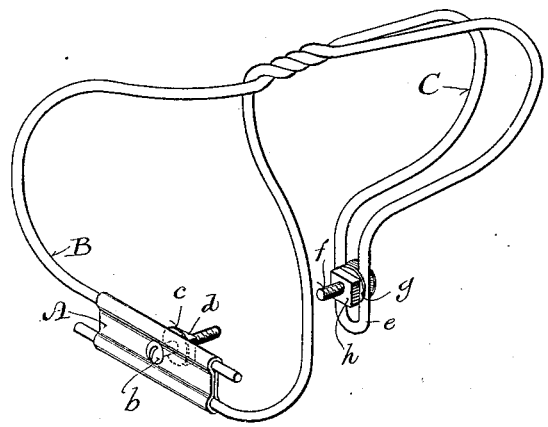
Witnesses:
Inventor:  
H. R. Sieverkropp  
By H. G. Underwood  
Attorney

UNITED STATES PATENT OFFICE.

HENRY R. SIEVERKROPP, OF RACINE, WISCONSIN.

BICYCLE PEDAL ATTACHMENT.

SPECIFICATION forming part of Letters Patent No. 638,649, dated December 5, 1899.

Application filed February 14, 1899. Serial No. 705,502. (No model.)

*To all whom it may concern:*

Be it known that I, HENRY R. SIEVERKROPP, a citizen of the United States, and a resident of Racine, in the county of Racine and State of Wisconsin, have invented certain new and useful Improvements in Bicycle Pedal Attachments; and I do hereby declare that the following is a full, clear, and exact description thereof.

My invention has for its object to facilitate speeding and control of a bicycle; and it consists in simple, economical, strong, and durable pedal attachments similar to the one hereinafter particularly set forth with reference to the accompanying drawing and subsequently claimed.

The drawing is a perspective view of a bicycle pedal attachment in accordance with my invention.

Referring by letter to the drawing, A indicates a spring-metal plate designed for detachable connection with the rear of a bicycle-pedal, as by means of the bolt $b$, washer $c$, and nut $d$ herein shown.

The plate is bent to form a pair of parallel split sleeves longitudinally thereof, and in adjustable engagement with the sleeve portions of the plate are the horizontal ends of a foot-clip B, provided with a toe-clip extension C, the two clips being herein shown made from a single stiff wire bent and twisted to avoid sharp angles. Compression of the plate-sleeves serves to hold the ends of the foot-clip in adjusted position, and this compression is had by the means employed to hold the plate in detachable connection with the pedal. The depending loop $e$ of the toe-clip is held to the front of the pedal by a bolt $f$, washer $g$, and nut $h$, said loop being vertically adjustable on the bolt.

The combined foot and toe clip is readily attachable to a bicycle-pedal similar to those now in common use, and the device as a whole not only insures foothold on the pedal to which it is connected, but also makes it possible for the bicycle-rider to exert more than an ordinary degree of lifting power upon said pedal.

While I have shown a preferred form of my invention, the same may be variously modified in the matter of structural detail, and therefore I do not wish to be understood as confining myself to the single-wire combined foot and toe clip herein particularly set forth.

Having thus described my invention, what I claim as new, and desire to secure by Letters Patent, is—

A plate bent to form a pair of parallel sleeves longitudinally thereof, means for clamping the plate to the rear of a bicycle-pedal, a foot-clip having ends thereof adjustable in said sleeves, a toe-clip constituting an extension of the foot-clip and means for clamping the toe-clip to the front of the pedal.

In testimony that I claim the foregoing I have hereunto set my hand, at Racine, in the county of Racine and State of Wisconsin, in the presence of two witnesses.

HENRY R. SIEVERKROPP.

Witnesses:
C. R. CARPENTER,
B. R. JONES.